United States Patent Office 3,164,572
Patented Jan. 5, 1965

3,164,572
BLENDED GLYCOL LIQUID POLYURETHANE
Seymour L. Axelrood, Trenton, Mich., assignor to Wyandotte Chemicals Corporation, Wyandotte, Mich., a corporation of Michigan
No Drawing. Filed Apr. 6, 1961, Ser. No. 101,062
19 Claims. (Cl. 260—77.5)

This invention relates to novel liquid polyurethane casting compositions. In one of its aspects this invention relates to liquid, curable polyurethane casting compositions. In another of its aspects this invention relates to cured cast polyurethane compositions having improved properties. In still another of its aspects this invention relates to a process for the production of liquid, curable polyurethane casting compositions.

This application is a continuation-in-part of my application Serial No. 19,499, filed April 4, 1960, now abandoned.

Polyurethane casting compositions have previously been prepared based on polyesters and polyethers, generally polytetramethylene ether glycol and also polypropylene ether glycol. These polyalkylene ether glycol materials have been employed as materials having a uniform molecular weight chosen to produce the optimum properties in the resulting polyurethane rubber. One of the problems, however, connected with the employment of the polymeric glycol material is the difficulty in achieving a given molecular weight on a consistent reproducible basis. That is, these polymeric glycols are known to vary from batch to batch so that it is not always possible to obtain a material of a chosen molecular weight. I have found that this problem can be alleviated by employing mixtures of high molecular weight polypropylene ether glycol with a lower molecular weight diol in proportions to achieve a definite average molecular weight polyol. I have further found, quite unexpectedly, that the properties of the polyurethane casting compositions obtained employing mixtures are improved over the properties of a polyol based on a single polyalkylene ether glycol having a molecular weight equal to the average molecular weight of a blend.

This invention has an object to provide novel liquid polyurethane casting compositions. A further object is to provide a liquid, curable polyurethane casting composition. Another object is to provide a cured cast polyurethane composition having improved properties. A further object is to provide a process for the production of a liquid, curable polyurethane casting composition. Other objects will appear hereinafter.

These and other objects are accomplished by the liquid, curable polyurethane casting composition which is obtained by heating at a temperature of about 60° C. to about 160° C. for a period of about 1 to 24 hours (a) 1.0 molar proportion of a polypropylene ether glycol having a molecular weight of from about 1,000 to 2,500, (b) 0.2 to 10 molar proportions of a diol having a molecular weight in the range between about 76 to about 1,000 and having the general formula $HO(GO)_nH$ wherein G is a divalent hydrocarbon radical selected from the group consisting of saturated aliphatic hydrocarbon radicals having 3 to 4 carbon atoms and isopropylidene-bis-cyclohexyl radical, wherein $n$ is 1 when G is isopropylidene-bis-cyclohexyl and $n$ is from 1 to 18 when G is a divalent saturated aliphatic hydrocarbon radical having 3 to 4 carbon atoms, and (c) 2.4 to 22 molar proportions of an organic diisocyanate, with the proviso that the ratio of the molecular weight of (a) to the molecular weight of (b) is at least 2.0, the average molecular weight of (a) and (b) combined is in the range between about 500 to about 1,750, and the NCO/OH ratio is in the range between 2 to 2.5.

The liquid, curable polyurethane casting compositions in the present invention are ordinarily prepared by heating the blend of higher molecular weight polypropylene ether glycol with the lower molecular weight diol and the organic diisocyanate at a temperature of about 60° C. to about 160° C. for a period of about 1 to 24 hours. The preferred conditions for the preparation are a temperature of about 80° C. to 100° C. for a period of about 2 to 4 hours. Variations in this, however, have been found to give desirable results, and in fact to improve some of the properties in the ultimate composition. Thus, for example, a 3-hour heating at 80° C. may be followed by a 2-hour heating at 140° C. A further alternative is to heat the reactants for 2 hours at 140° C. Since the reaction between the hydroxyl groups and isocyanate groups is exothermic the heat of the reaction will raise the temperature of the reaction mass. However, agitation is normally employed to secure thorough mixing of the reactants and to aid in temperature control. After the initial heat of reaction, the mixture is stirred for the periods and temperatures hereinbefore set forth until all of the hydroxyl groups have been reacted with isocyanate groups. This reaction gives urethane groups which link the various components together. The completion of the reaction can be determined by analysis for free isocyanate in the usual manner. It is to be understood that various modifications of this method for the preparation of these liquid, curable casting compositions can be made in that some of the hydroxyl-containing reactants may be first reacted with a molar excess of the organic diisocyanate followed by the reaction of the remaining hydroxyl-containing reactants with the remaining organic diisocyanate.

The polypropylene ether glycol of high molecular weight used to prepare the liquid casting compositions of the present invention are generally obtained by the polymerization of propylene oxide with propylene glycol. They have a molecular weight in the range between about 1,000 and 2,500, preferably about 2,000. The molecular weights of these glycols are determined from the hydroxyl numbers and, it will be understood, represent average molecular weights. Since they are obtained by polymerization, molecules of both lower and higher molecular weights are present in a polyproplene ether glycol of any given molecular weight. These higher molecular weight polypropylene ether glycols are chosen to have a molecular weight in the aforementioned range, which molecular weight is at least twice the molecular weight of the diol which is blended with it, as will be described more fully hereinafter. Specific examples of polypropylene ether glycols which may be used in accordance with the present invention are available commercially under the trade name Pluracol P2010 and P1010 having average molecular weights of about 2,000 and about 1,000 respectively.

The lower molecular weight diol blended with the polypropylene ether glycol described hereinbefore in accordance with the present invention has a molecular weight in the range between about 76 to about 1,000 and is represented by the general formula $HO(GO)_nH$ wherein G is a divalent hydrocarbon radical selected from the group consisting of saturated aliphatic hydrocarbon radicals having from 3 to 4 carbon atoms and isopropylidene-bis-cyclohexyl radical, wherein $n$ is 1 when G is isopropylidene-bis-cyclohexyl and $n$ is from 1 to 18 when G is a divalent saturated aliphatic hydrocarbon radical having from 3 to 4 carbon atoms. Illustrative specific examples of compounds which can be used in accordance with the present invention include dipropylene glycol, 1,4-butane diol, polypropylene ether glycol of molecular weight ranging up to about 1,000, polytetramethylene ether glycol of molecular weight up to about 1,000 and hydrogenated Bisphenol A which chemically is isopropylidene-bis-(4-cyclohexanol). Preferred materials include polypropylene ether glycol of about 400 and 1,000 molecular weight and hydrogenated Bisphenol A. It is to be understood that the lower molecular weight diol is chosen so that the ratio of the high molecular weight polypropylene ether glycol described hereinbefore to the molecular weight of the diol here under consideration is at least 2.0, and preferably greater, viz., about 5. In this way it is possible to acheive in optimum proportions a blend of the two having an average molecular weight in the range between about 500 and 1,750. In general, the molar proportions of the lower molecular weight diol employed per molar equivalent of high molecular weight polypropylene ether glycol will range between about 0.2 to about 10.

I have found that a blend of polypropylene ether glycol of 2,000 molecular weight with polypropylene ether glycol of about 400 molecular weight in proportions sufficient to provide an average molecular weight in the range between about 1,000 and 1,500 produces improved properties in the ultimate composition over those obtained using straight polyoxyalkylene ether glycols of a given molecular weight. That is, urethane compositions, produced from such a blend having an average molecular weight within the range of 1,000 to 1,500, have a higher tensile strength, hardness, modulus and tear strength. I also discovered, quite unexpectedly, that urethane compositions produced from a blend of polypropylene ether glycol of 2,000 molecular weight with polypropylene ether glycol of about 1,000 molecular weight exhibit a lower hardness value with respect to straight polyoxypropylene glycol ethers at average molecular weights of less than 1,500 but a higher hardness at average molecular weights above 1,500. Hence, unlike compositions produced from blends of polypropylene ether glycols of 2,000 and 400 molecular weight which exhibit higher elastomer properties, the urethane composition produced from a blend of 2,000 and 1,000 molecular weight polyproplyene ether glycol can have either a lower or a higher hardness than a straight polypropylene ether glycol. Thus blends of 2,000 and 1,000 molecular weight polypropylene ether glycols are especially useful where there is a requirement of low hardness.

As representative of the typical organic diisocyanates which may be used in preparing the novel liquid, curable coating compositions of the present invention, there may be mentioned phenylene diisocyanate, tolylene diisocyanate, hexamethylene-1,6-diisocyanate, tetramethylene-1,4-diisocyanate, cyclohexane-1,4-diisocyanate, naphthalene-1,5-diisocyanate, methylene bis-(4-phenyl isocyanate) and 4,4'-biphenylene diisocyanate. Mixtures of tolylene-2,4- and 2,6-diisocyanate can be used. The preferred diisocyanate is tolylene-2,4-diisocyanate. In general, the diisocyanates having the isocyanate groups substituted on aromatic rings are preferred since they are more readily available commercially. However, instances may arise wherein the aliphatic diisocyanates may be more desirable, as when the composition is to be cured with a particular kind of curing agent. In general, from about 2.4 to 22 molar proportions of the organic diisocyanate reactant should be used in the preparation of the liquid, curable casting composition. However, the specific molar proportion of the diisocyanate used depends upon the molar proportion of the hydroxyl-containing components which have been employed. In general, the organic diisocyanate should be employed in a quantity sufficient to provide an NCO/OH ratio in the range between 2.0 to 2.5. When the average molecular weight of the blend of polyols employed is at the lower end of the average molecular weight range, viz., around 500, it is desirable, and preferred, that the NCO/OH ratio not exceed about 2.05.

The liquid curable polyurethane casting compositions obtained in the manner hereinbefore described can be cured with a compound having a plurality of functional groups which compound may be selected from the group consisting of aromatic primary diamines having a melting point below about 136° C. and mixtures of such diamines with aliphatic polyhydroxy compounds having an equivalent weight below about 350. The liquid, curable polyurethane casting composition is mixed with the curing composition in a quantity sufficient to supply a ratio of NCO/active functional group in the range between about 1.0 and 1.3 and heated at a temperature in the range between about 70° C. and about 160° C. for a period of from about 15 minutes to about 24 hours. The NCO referred to in this ratio is the amount of uncombined isocyanate groups free to react with the active functional groups in the curing composition. These free isocyanate groups include those contained in unreacted organic diisocynate as well as the terminal isocyanate groups resulting from the reaction of the organic diisocyanate with the original polyol blend. Uncombined NCO can be determined by conventional methods. It will be understood that a shorter period is required for a higher temperature and vice versa. Illustrative examples of aromatic primary diamines which can be employed as the curing agent include 4,4'-methylene bis-(chloroaniline) and dichlorobenzidine. Examples of aliphatic polyhydroxy compounds which can be employed in admixture with the diamine include castor oil, trimethylolpropane, pentaerythritol, the propylene oxide adduct of trimethylolpropane having an average molecular weight of about 450, the propylene oxide adduct of pentaerythritol having an average molecular weight of about 600, etc. When a blend of diamine and aliphatic polyol is employed there must be present at least about 30 weight percent of the diamine, and preferably a higher percentage. The preferred curing agent for the liquid, curable polyurethane casting compositions in the present invention is 4,4'-methylene bis-(2-chloroanaline), available from E. I. du Pont de Nemours & Company under the trade name MOCA. The preferred curing conditions, employing MOCA as a curing agent are 3 hours at about 100° C. It will be appreciated that the conditions of the cure will be chosen with relation to the activity of the curing agent so that a more active curing agent will require a lesser period and temperature condition. In mixing the liquid, curable polyurethane casting composition with the curing agent it is preferred to heat the curing agent to a temperature at least sufficiently to liquefy it, preferably at about 110 to 120° C. when using MOCA.

As was pointed out above, the curing agent and the liquid, curable polyurethane casting composition should be intimately mixed. If the curing compound is solid, it should be finely ground so that complete mixing with the liquid composition can take place. After the two components are thoroughly and intimately mixed, the liquid mixture may be poured into a mold and permitted to stand until it solidifies. After solidification the solid in the mold may then be subjected to pressure in a press while heating. Alternatively, the liquid mixture may be cast into a slab, which, on solidification, is placed in a suitable mold and put into a press which forces it into the mold, whereupon it is then heated. It will be apparent, however, that pressure need not be used in effecting a good cure.

The cured cast polyurethane compositions which were prepared employing a blend of polypropylene ether glycol and low molecular weight diol showed desirable variations in elastomer properties with respect to compositions employing straight polypropylene ether glycol. For example, urethane compositions employing a blend of 2,000 and 400 polypropylene ether glycols having an average molecular weight of about 1,250 exhibit a higher hardness value than those urethane compositions prepared from straight polypropylene ether glycols of the same average molecular weight. On the other hand, urethane compositions employing a blend of 2,000 and 1,000 polypropylene ether glycols of an average molecular weight of 1,250 possess a lower hardness value with respect to straight polypropylene ether glycols. Thus, by the method of this invention, a urethane composition can be tailor-made for a particular application. The liquid, curable polyurethane casting compositions of the present invention may be used for preparing a wide variety of elastomeric products, such as gaskets and other types of seals or in the formation of elastomeric bonds between articles, as in laminants. The properties of the ultimate elastomers may be further varied by suitable compounding of the composition prior to the time it is allowed to stand until it becomes a moldable solid. Conventional compounding agents may be used, such as carbon black, silica, plasticizers, etc.

The following examples will better illustrate the nature of the present invention. However, the invention is not intended to be limited by these examples. The properties of the cured cast composition were obtained using generally standard test methods. A modification of ASTM Designation D412-51T was used for measurement of stress-strain properties. The tensile testing machine was an Instron Model TPC-M-1. Initial jaw separation was ¾ inch. The rate of separation was 20 inches per minute. The Instron machine employed draws its own stress-strain curve from which the values for tensile strength and stress at 300 percent elongation were determined.

The Graves tear determination test was run on the Instron machine as per ASTM Designation D624-54, Die C, an unnicked 90° angle specimen.

The hardness of the ultimate composition was measured with a Shore type A durometer under a 3-pound dead weight. Measurements were made 5 seconds after contact of the indenter with the specimen. The method is according to ASTM Designation D676-59T. Tests were run at 76±6° F. Shore A hardness may be converted to ASTM "hardness number" by substracting the Shore A value from 100. This test was run on ½ inch discs.

Bashore rebound was determined using a Precision Bashore resiliometer described in catalogue No. 40 of the Precision Scientific Company. This test is a simple, well known means of obtaining comparative data on resilience or springiness of elastomers. A 1-ounce stainless steel plunger is dropped a distance of approximately 16 inches onto a ½ inch thick sample. The height it rebounds to is measured and reported on the basis of 100 equals 100% rebound.

The procedure employed in the preparation of the liquid, curable polyurethane casting composition was the same in all examples, irrespective of whether a straight polypropylene ether glycol was used or a blend of high molecular weight polypropylene ether glycol with a lower molecular weight diol was used. Polyols used in the preparation of the liquid, curable casting composition were all stripped of water, using one part of toluene for five parts of polyol. As the toluene was stripped off, the temperature increased from room temperature and the vacuum became more effective until a vacuum of 3 mm. of mercury and a maximum temperature of 120° C. were reached. These conditions were maintained until all bubbling ceased. The polyol was then cooled to below 50° C. and the tolylene diisocyanate added. The tolylene diisocyanate and the polyol reactants were reacted for 3 hours at 80° C. During the last hour of the reaction, a vacuum was applied. The resulting compositions were aged at room temperature for about 2 days following which the free isocyanate and viscosity were determined using conventional methods.

The procedure employed in curing the liquid, curable polyurethane casting composition was the same in all examples with the exception of Example 4 where a higher temperature was used. Weighed amounts of the liquid composition in 4-oz. capped bottles were heated in a 100° C. air recriculating oven for 15 minutes. The tops were then removed from the bottles and the contents degassed for from 10 to 30 minutes at 100° C. in a vacuum oven until the bubbling stopped. The curing agent, in liquid form, was stirred into the hot liquid composition and mixing continued until homogeneity was assured. The resulting mixtures were then heated in the oven at a temperature of about 100° C. for a period of about 3 hours. After cooling the chemical properties were determined.

*Example 1*

Two liquid, curable polyurethane casting compositions were prepared using procedures described hereinabove. In one a blend containing 1.0 molar proportion of polypropylene ether glycol having a molecular weight of 2,000 and about 0.46 molar proportion of polypropylene ether glycol having a molecular weight of 400, said blend having an average molecular weight of about 1,500, was reacted with about 3.0 molar proportions of 2,4-tolylene diisocyanate. In the other 2,4-tolylene diisocyanate was reacted with a polypropylene ether glycol having a molecular weight of 1,578. In both instances, the NCO/OH ratio was 2.0.

Each of the liquid, curable polyurethane casting compositions so prepared was cured in the manner described hereinabove using 4,4'-methylene bis-(2-chloroaniline) in a quantity sufficient to provide an NCO/NH$_2$ ratio of 1.18.

The comparative properties of the cured compositions are set forth in Table 1.

TABLE 1

| | Blend | PPG 1578 |
|---|---|---|
| Tensile Strength, p.s.i. | 3,450 | 3,350 |
| 300% Modulus, p.s.i. | 885 | 535 |
| Graves Tear, p.i. | 214 | 140 |
| Shore A Hardness, 5" | 77 | 65 |
| Bashore Rebound | 26 | 22 |

*Example 2*

Three liquid, curable polyurethane casting compositions were prepared using the procedures described hereinabove. In one, blend A, 1.0 molar proportion of polypropylene ether glycol having a molecular weight of about 2,000 and about 0.86 molar proportion of polypropylene ether glycol having a molecular weight of about 400, said blend having an average molecular weight of about 1,250, was reacted with about 3.7 molar proportions of 2,4-tolylene diisocyanate. In the second, blend B, 1.0 molar proportion of polypropylene ether glycol having a molecular weight of about 2,000 and about 0.75 molar proportion of hydrogenated Bisphenol A, molecular weight 240, said blend having an average molecular weight of about 1,250, was reacted with about 3.5 molar proportions of 2,4-tolylene diisocyanate. In the third 2,4-tolylene diisocyanate was reacted with polypropylene ether glycol having a molecular weight of about 1,280. In all instances the NCO/OH ratio was 2.0.

Each of the liquid, curable polyurethane casting compositions prepared above was cured in the manner described hereinbefore using 4,4'-methylene bis-(2-chloroaniline) in a quantity sufficient to provide an NCO/NH$_2$ ratio of 1.16.

The comparative properties of the cured compositions are set forth in Table 2.

TABLE 2

| | Blend A | Blend B | PPG 1280 |
|---|---|---|---|
| Tensile Strength, p.s.i. | 5,065 | 4,840 | 4,585 |
| 300% Modulus, p.s.i. | 1,430 | 2,000 | 970 |
| Graves Tear, p.i. | 285 | 355 | 210 |
| Shore A Hardness, 5" | 82 | 89 | 75 |
| Bashore Rebound | 27 | 29 | 19 |

*Example 3*

Two liquid, curable polyurethane casting compositions were prepared using the procedure described hereinabove. In one a blend containing 1.0 molar proportion of polypropylene ether glycol having a molecular weight of 2,000 and about 1.67 molar proportions of polypropylene ether glycol having a molecular weight of about 400, said blend having an average molecular weight of about 1,000, was reacted with about 5.3 molar proportions of 2,4-tolylene diisocyanate. In the other, 2,4-tolylene diisocyanate was reacted with a polypropylene ether glycol having a molecular weight of 1,000. In both instances the NCO/OH ratio was 2.0.

Each of the foregoing liquid, curable polyurethane casting compositions was cured in the manner described hereinbefore using 4,4'-methylene bis-(2-chloroaniline) in a quantity sufficient to provide an NCO/NH$_2$ ratio of 1.14.

The comparative properties of the cured compositions are set forth in Table 3.

TABLE 3

|  | Blend | PPG 1000 |
| --- | --- | --- |
| Tensile Strength, p.s.i. | 5,440 | 5,110 |
| 300% Modulus, p.s.i. | 2,490 | 2,080 |
| Graves Tear, p.i. | 400 | 310 |
| Shore A Hardness, 5" | 91 | 90 |
| Bashore Rebound | 32 | 24 |

*Example 4*

Two liquid, curable polyurethane casting compositions were prepared using the procedure described hereinabove. In the comparison a polypropylene ether glycol having a molecular weight of about 775 was reacted with 2,4-tolylene diisocyanate in a quantity sufficient to provide an NCO/OH ratio of 2.0. The liquid, curable polyurethane casting composition compared with the preceding material, which is based on a single polypropylene ether glycol, was a mixture of two liquid, polyurethane casting compositions, one of which was obtained by reacting 1 molar proportion of polypropylene ether glycol having a molecular weight of 2,000 with 2 molar proportions of tolylene diisocyanate (A), and the other was a composition prepared by reacting 1 molar proportion of polypropylene ether glycol having a molecular weight of about 400 with 2 molar proportions of 2,4-tolylene diisocyante (B). These two materials were combined in a proportion of 45.4 parts by weight of (A) to 54.6 parts by weight of (B) to provide a mixture having an average molecular weight of polyol of 775 and having an NCO/OH ratio of 2.0.

The comparison liquid, curable polyurethane composition based on the single molecular weight polyol and the liquid, curable composition based on the mixture (A) + (B) were cured in the manner described hereinabove except that a temperature of 122° C. instead of 100° C. was used. The curing agent consisted of a blend containing about 55 weight percent of 4,4'-methylene bis-(2-chloroaniline) and 45 weight percent of a polyoxypropylene either adduct of trimethylolpropane having an average molecular weight of about 445 and an equivalent weight of about 148. The quantity of the curing agent employed was sufficient to provide an NCO/(NH$_2$+OH) ratio of about 1.1.

The comparative properties of the cured compositions are set forth in Table 4.

*Table 4*

|  | Blend | PPG 775 |
| --- | --- | --- |
| Tensile Strength, p.s.i. | 4,150 | 4,800 |
| 300% Modulus, p.s.i. | 2,640 | 2,510 |
| Graves Tear, p.i. | 340 | 260 |
| Shore A Hardness, 5" | 95 | 92 |
| Bashore Rebound | 35 | 33 |

*Example 5*

Three liquid, curable polyurethane casting compositions were prepared using the procedures described hereinabove. In one, blend A, 1.0 molar proportion of polypropylene ether glycol having a molecular weight of about 2,000 and about 3.0 molar proportions of polypropylene ether glycol having a molecular weight of about 1,000, said blend having an average molecular weight of about 1,250, was reacted with about 8.0 molar proportions of 2,4-tolylene diisocyanate. In the second, blend B, 1.0 molar proportion of polypropylene ether glycol having a molecular weight of about 2,000 and about 1.0 molar proportion of polypropylene ether glycol having a molecular weight of about 1,000, said blend having an average molecular weight of about 1,500, was reacted with about 4.0 molar proportions of 2,4-tolylene diisocyanate. In the third, blend C, 1.0 molar proportion of polypropylene ether gycol having a molecular weight of 2,000 and about 0.33 molar proportion of polypropylene ether glycol having a molecular weight of about 1,000, said blend having an average molecular weight of about 1,750, was reacted with about 2.7 molar proportions of 2,4-tolylene diisocyanate.

Each of the liquid, curable polyurethane casting compositions prepared above was cured in the manner described hereinbefore using 4,4'-methylene bis-(2-chloroaniline) in a quantity sufficient to provide an NCO/NH$_2$ ratio of 1.16, 1.18, and 1.20 with blends A, B and C, respectively.

The comparative properties of the cured compositions are set forth in Table 5,

*Table 5*

|  | Blend A | Blend B | Blend C |
| --- | --- | --- | --- |
| Tensile Strength, p.s.i. | 4,300 | 3,350 | 2,645 |
| 300% Modulus, p.s.i. | 900 | 615 | 550 |
| Graves Tear, p.i. | 185 | 160 | 170 |
| Shore A Hardness, 5" | 69 | 67 | 67 |
| Bashore Rebound | 17 | 21 | 28 |

It can be seen from the foregoing examples that it is possible, through the use of blends of polypropylene ether glycols and lower molecular weight diols, to achieve polyurethane compositions which have superior combinations of properties when compared with compositions prepared from singular molecular weight glycols. Thus, I present to the art a method by which it is possible to vary the physical properties of elastomers so as to achieve the desired properties for a given application.

While this invention has been described and exemplified in terms of its preferred embodiments, those skilled in the art will appreciate that modifications can be made without departing from the spirit and scope of the invention as described and claimed herein.

I claim:

1. A liquid, curable polyurethane casting composition obtained by heating to a temperature of about 60° to about 160° C. for a period of about 1 to 24 hours (a) 1.0 molar proportion of a polypropylene ether glycol having a molecular weight of from about 1,000 to 2,500, (b) 0.2 to 10 molar proportions of a diol having a molecular weight in the range between about 76 to about 1,000 and having the general formula HO(GO)$_n$H wherein G is a divalent hydrocarbon radical selected from the group consisting of saturated aliphatic hydrocarbon radicals having 3 to 4 carbon atoms and isopropylidene-bis-cyclohexyl radical, wherein n is 1 when G is isopropylidene-bis-cyclohexyl and n is from 1 to 18 when G is a divalent saturated alphatic hydrocarbon radical having 2 to 4 carbon atoms, and (c) 2.4 to 22 molar proportions of an organic diisocyanate, with the proviso that the ratio of the molecular weight of (a) to the molecular weight of (b) is at least 2.0, the average molecular weight of (a) and (b) combined is in the range between about 500 to about 1,750, and the NCO/OH ratio is in the range between 2 to 2.5.

2. A liquid, curable polyurethane casting composition according to claim 1 where G in (b) is a propylene radical and the organic diisocyanate employed is tolylene diisocyanate.

3. A liquid, curable polyurethane casting composition obtained by heating to a temperature of about 80 to 100° C. for a period of about 2 to 4 hours (a) 1.0 molar proportion of polypropylene ether glycol having a molecular weight of about 2,000, (b) about 1.67 molar proportions of polypropylene ether glycol having a molecular weight of about 400, and (c) between about 5.3 and 6.5 molar proportions of tolylene diisocyanate.

4. A liquid, curable polyurethane casting composition obtained by heating to a temperature of about 80 to 100° C. for a period of about 2 to 4 hours (a) 1.0 molar proportion of polypropylene ether glycol having a molecular weight of about 2,000, (b) about 0.86 molar proportion of polypropylene ether glycol having a molecular weight of about 400, and (c) between about 3.7 and 4.5 molar proportions of tolylene diisocyanate.

5. A liquid, curable polyurethane casting composition obtained by heating to a temperature of 80 to 100° C. for a period of about 2 to 4 hours (a) 1.0 molar proportion of polypropylene ether glycol having a molecular weight of about 2,000, (b) about 0.46 molar proportion of polypropylene ether glycol having a molecular weight of about 400, and (c) between about 2.9 and 3.6 molar proportions of tolylene diisocyanate.

6. A liquid, curable polyurethane casting composition obtained by heating at a temperature of about 80 to 100° C. for a period of about 2 to 4 hours (a) 1.0 molar proportion of polypropylene ether glycol having a molecular weight of about 2,000, (b) about 0.75 molar proportion of isopropylidene-bis-(4-cyclohexanol), and (c) between about 3.5 and 4.4 molar proportions of tolylene diisocyanate.

7. A liquid, curable polyurethane casting composition obtained by heating at a temperature of about 80 to 100° C. for a period of about 2 to 4 hours (a) 1.0 molar proportion of polypropylene ether glycol having a molecular weight of about 2,000, (b) about 3.0 molar proportions of polypropylene ether glycol having a molecular weight of about 1,000, and (c) between about 8 and 9.5 molar proportions of tolylene diisocyanate.

8. A cured cast polyurethane composition obtained by heating the composition of claim 1 for a period in the range of from 15 minutes to about 24 hours at a temperature in the range between about 70° C. to about 160° C. with a composition containing a plurality of functional groups, said composition being selected from the group consisting of aromatic primary diamines having a melting point below 136° C. and mixtures of said aromatic primary diamines with aliphatic polyhydroxy compounds having an equivalent weight below about 350, said mixtures being further characterized in that they contain at least 30 weight percent of the aromatic primary diamines, the quantity of the curing composition being sufficient to provide a ratio of NCO/active functional groups in the range between about 1.0 and 1.3.

9. A cured cast polyurethane composition obtained by heating the composition of claim 3 for a period of about 3 hours at a temperature of about 100° C. with a quantity of 4,4'-methylene bis-(2-chloroaniline) sufficient to provide an NCO/NH$_2$ ratio of about 1.14.

10. A cured cast polyurethane composition obtained by heating the composition of claim 4 for a period of about 3 hours at a temperature of about 100° C. with a quantity of 4,4'-methylene bis-(2-chloraniline) sufficient to provide an NCO/NH$_2$ ratio of about 1.16.

11. A cured cast polyurethane composition obtained by heating the composition of claim 5 for a period of about 3 hours at a temperature of about 100° C. with a quantity of 4,4'-methylene bis-(2-chloroaniline) sufficient to provide an NCO/NH$_2$ ratio of about 1.18.

12. A cured cast polyurethane composition obtained by heating the composition of claim 7 for a period of about 3 hours at a temperature of about 100° C. with a quantity of 4,4'-methylene bis-(2-chloroaniline) sufficient to provide an NCO/NH$_2$ ratio of about 1.16.

13. A method for the preparation of a liquid, curable polyurethane casting composition which comprises heating at a temperature between about 60 to about 160° C. for a period of from about 1 to about 24 hours (a) 1.0 molar proportion of a polypropylene ether glycol having a molecular weight of from about 1,000 to 2,500, (b) 0.2 to 10 molar proportions of a diol having a molecular weight in the range between about 76 to about 1,000 and having the general formula HO(GO)$_n$H wherein G is a divalent hydrocarbon radical selected from the group consisting of saturated aliphatic hydrocarbon radicals having 3 to 4 carbon atoms and isopropylidene-bis-cyclohexyl radical, wherein $n$ is 1 when G is isopropylidene-bis-cyclohexyl and $n$ is from 1 to 18 when G is a divalent saturated aliphatic hydrocarbon radical having 3 to 4 carbon atoms, and (c) 2.4 to 24 molar proportions of an organic diisocyanate, with the proviso that the ratio of the molecular weight of (a) to the molecular weight of (b) is at least 2.0, the average molecular weight of (a) and (b) combined is in the range between about 500 to about 1,750, and the NCO/OH ratio is in the range between 2 to 2.5.

14. A method according to claim 13 wherein G in (b) is a propylene radical, $n$ is between 1 and 18, and the organic diisocyanate employed is tolylene diisocyanate.

15. A method for the preparation of a liquid, curable polyurethane casting composition which comprises heating at a temperature of about 80 to 100° C. for a period of about 2 to 4 hours (a) 1.0 molar proportion of polypropylene ether glycol having a molecular weight of about 2,000, (b) about 1.67 molar proportions of polypropylene ether glycol having a molecular weight of about 400, and (c) between about 5.3 and 6.5 molar proportions of tolylene diisocyanate.

16. A method for the preparation of a liquid, curable polyurethane casting composition which comprises heating at a temperature of about 80 to 100° C. for a period of about 2 to 4 hours (a) 1.0 molar proportion of polypropylene ether glycol having a molecular weight of about 2,000, (b) about 0.86 molar proportion of polyproylene ether glycol having a molecular weight of about 400, and (c) between about 3.7 and 4.5 molar proportions of tolylene diisocyanate.

17. A method for the preparation of a liquid, curable polyurethane casting composition which comprises heating at a temperature of about 80 to 100° C. for a period of about 2 to 4 hours (a) 1.0 molar proportion of polypropylene ether glycol having a molecular weight of about 2,000, (b) about 0.46 molar proportion of polypropylene ether glycol having a molecular weight of about 400, and (c) between about 2.9 and 3.6 molar proportions of tolylene diisocyanate.

18. A method for the preparation of a liquid, curable polyurethane casting composition which comprises heating at a temperature of about 80 to 100° C. for a period of about 2 to 4 hours (a) 1.0 molar proportion of polypropylene ether glycol having a molecular weight of about 2,000, (b) about 0.75 molar proportion of isopropylidene-bis-(4-cyclohexanol), and (c) between about 3.5 and 4.4 molar proportions of tolylene diisocyanate.

19. A method for the preparation of a liquid, curable polyurethane casting composition which comprises heating at a temperature of about 80 to 100° C. for a period of about 2 to 4 hours (a) 1.0 molar proportion of polypropylene ether glycol having a molecular weight of about 2,000, (b) about 3.0 molar proportions of polypropylene ether glycol having a molecular weight of about 1,000, and (c) between about 8 and 9.5 molar proportions of tolylene diisocyanate.

References Cited in the file of this patent

UNITED STATES PATENTS

| | | |
|---|---|---|
| 2,894,919 | Simon | July 14, 1959 |
| 2,899,411 | Schollenberger | Aug. 11, 1959 |
| 2,917,489 | Gladding | Dec. 15, 959 |

UNITED STATES PATENT OFFICE
CERTIFICATE OF CORRECTION

Patent No. 3,164,572

January 5, 1965

Seymour L. Axelrood

It is hereby certified that error appears in the above numbered patent requiring correction and that the said Letters Patent should read as corrected below.

Column 4, line 12, for "diisocynate" read -- diisocyanate --; column 6, TABLE 1, second column, line 3 thereof, for "214" read -- 215 --; column 7, line 54, for "either" read -- ether --; column 8, line 64, for "alphatic" read -- aliphatic --; line 65, for "2 to 4" read -- 3 to 4 --.

Signed and sealed this 6th day of July 1965.

(SEAL)
Attest:

ERNEST W. SWIDER
Attesting Officer

EDWARD J. BRENNER
Commissioner of Patents